United States Patent
Furcoiu

(10) Patent No.: US 11,391,405 B2
(45) Date of Patent: Jul. 19, 2022

(54) DEPLOYMENT PROBE FOR PIPE REPAIR DEVICE

(71) Applicant: Mueller International, LLC, Atlanta, GA (US)

(72) Inventor: Aurelian Ioan Furcoiu, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 10 days.

(21) Appl. No.: 16/987,067

(22) Filed: Aug. 6, 2020

(65) Prior Publication Data

US 2021/0041051 A1 Feb. 11, 2021

Related U.S. Application Data

(60) Provisional application No. 62/885,031, filed on Aug. 9, 2019.

(51) Int. Cl.
*F16L 55/163* (2006.01)
*F16L 101/18* (2006.01)

(52) U.S. Cl.
CPC ......... *F16L 55/163* (2013.01); *F16L 2101/18* (2013.01)

(58) Field of Classification Search
CPC .......... F16L 55/18; F16L 55/163; F16L 55/16
USPC ...................................... 138/98, 97
See application file for complete search history.

(56) References Cited

U.S. PATENT DOCUMENTS

| | | | |
|---|---|---|---|
| 3,895,652 A * | 7/1975 | Zach | B65D 39/12 138/89 |
| 4,589,447 A | 5/1986 | Kane et al. | |
| 4,647,072 A | 3/1987 | Westman | |
| 5,119,862 A | 6/1992 | Maimets et al. | |
| 5,351,720 A | 10/1994 | Maimets | |
| 6,712,556 B2 | 3/2004 | Penza | |
| 6,820,653 B1 | 11/2004 | Schempf et al. | |
| 7,025,580 B2 | 4/2006 | Heagy et al. | |
| 7,172,370 B2 | 2/2007 | Schmidt | |

(Continued)

FOREIGN PATENT DOCUMENTS

| | | |
|---|---|---|
| EP | 0621015 | 10/1994 |
| JP | 2005278993 | 10/2005 |

(Continued)

OTHER PUBLICATIONS

US 11,035,513 B2, 06/2021, Furcoiu (withdrawn)

(Continued)

*Primary Examiner* — Patrick F Brinson
(74) *Attorney, Agent, or Firm* — Taylor English Duma LLP

(57) ABSTRACT

Example aspects of a pipe repair assembly, a deployment probe for repairing a pipeline, and a method of repairing a pipeline are disclosed. The pipe repair assembly can comprise a retainer device comprising a retainer tab extending into a retainer slot, the retainer device movable between an engaged position and a disengaged position; and a pipe repair device comprising a spring and an engagement tab, the engagement tab defining a channel, wherein, in the engaged position, the engagement tab is received in the retainer slot and the retainer tab engages the channel, and in the disengaged position, the engagement tab is disposed outside of the retainer slot and the retainer tab is disengaged from the channel.

17 Claims, 5 Drawing Sheets

(56) References Cited

U.S. PATENT DOCUMENTS

| | | | |
|---|---|---|---|
| 7,267,141 | B1 | 9/2007 | De Meyer et al. |
| 8,488,290 | B2 | 7/2013 | Kauffman |
| 8,783,297 | B2 | 7/2014 | Hawwa et al. |
| 9,052,051 | B2 | 6/2015 | Maimets et al. |
| 10,641,427 | B2* | 5/2020 | Braun .................. F16L 55/44 |
| 11,079,058 | B2 | 8/2021 | Furcoiu |
| 11,187,366 | B2 | 11/2021 | Furcoiu |
| 11,221,099 | B2 | 1/2022 | Braun et al. |
| 11,326,731 | B2 | 5/2022 | Furcoiu |
| 2002/0144822 | A1 | 10/2002 | Hackworth et al. |
| 2003/0017775 | A1 | 1/2003 | Sowinski et al. |
| 2003/0233140 | A1 | 12/2003 | Hartley et al. |
| 2004/0236398 | A1 | 11/2004 | Burgmeier et al. |
| 2008/0140178 | A1 | 6/2008 | Rasmussen et al. |
| 2008/0255660 | A1 | 10/2008 | Guyenot et al. |
| 2008/0269789 | A1 | 10/2008 | Eli |
| 2010/0010617 | A1 | 1/2010 | Goodson, IV et al. |
| 2010/0049313 | A1 | 2/2010 | Alon et al. |
| 2010/0263759 | A1* | 10/2010 | Maimets ............... F16L 55/163 138/98 |
| 2011/0264186 | A1 | 10/2011 | Berglung et al. |
| 2012/0273078 | A1 | 11/2012 | Hawwa et al. |
| 2013/0018450 | A1 | 1/2013 | Hunt |
| 2013/0131783 | A1 | 5/2013 | Shalev et al. |
| 2013/0158646 | A1 | 6/2013 | Roeder |
| 2016/0120638 | A1 | 5/2016 | Michalak |
| 2016/0143732 | A1 | 5/2016 | Glimsdale |
| 2016/0238178 | A1 | 8/2016 | Urbanski |
| 2017/0231765 | A1 | 8/2017 | Desrosiers et al. |
| 2017/0304092 | A1 | 10/2017 | Hong et al. |
| 2019/0093813 | A1 | 3/2019 | Badger et al. |
| 2019/0301657 | A1 | 10/2019 | Braun et al. |
| 2020/0224811 | A1 | 7/2020 | Braun et al. |
| 2020/0263823 | A1 | 8/2020 | Furcoiu |
| 2020/0292119 | A1* | 9/2020 | Furcoiu ................ F16L 55/18 |
| 2020/0292120 | A1* | 9/2020 | Furcoiu ............... F16L 55/163 |
| 2020/0340610 | A1 | 10/2020 | Furcoiu |
| 2021/0041052 | A1 | 2/2021 | Furcoiu |
| 2021/0381637 | A1 | 12/2021 | Furcoiu |

FOREIGN PATENT DOCUMENTS

| | | |
|---|---|---|
| KR | 1020070018627 | 2/2007 |
| WO | 2011001189 | 1/2011 |
| WO | 2019194870 | 10/2019 |
| WO | 2020172136 | 8/2020 |
| WO | 2020219294 | 10/2020 |

OTHER PUBLICATIONS

Furcoiu, Aurelian Ioan; Requirement for Restriction/Election for U.S. Appl. No. 17/792,984, filed Feb. 18, 2020, dated Apr. 1, 2021, 6 pgs.

Furcoiu, Aurelian Ioan; Non-Final Office Action for U.S. Appl. No. 16/786,193, filed Feb. 10, 2020, dated Feb. 4, 2021, 22 pgs.

Furcoiu, Aurelian Ioan; Non-Final Office Action for U.S. Appl. No. 16/786,246, filed Feb. 10, 2020, dated Mar. 4, 2021, 21 pgs.

Furcoiu, Aurelian Ioan; Requirement for Restriction/Election for U.S. Appl. No. 16/786,246, filed Feb. 10, 2020, dated Feb. 3, 2021, 6 pgs.

Braun, Clifton; Non-Final Office Action for U.S. Appl. No. 16/112,207, filed Aug. 24, 2018, dated Nov. 5, 2019, 14 pgs.

Braun, Clifton; Notice of Allowance for U.S. Appl. No. 16/112,207, filed Aug. 24, 2018, dated Feb. 13, 2020, 13 pgs.

Braun, Clifton; International Preliminary Report on Patentability for PCT Application No. PCT/US18/63325, filed Nov. 30, 2018, dated Oct. 15, 2020, 7 pgs.

Braun, Clifton; International Search Report for PCT Application No. PCT/US18/63325, filed Nov. 30, 2018, dated Feb. 5, 2019, 8 pgs.

Furcoiu, Aurelian Ioan; International Search Report and Written Opinion for PCT Application No. PCT/US20/28038, filed Apr. 14, 2020, dated Jun. 24, 2020, 9 pgs.

Furcoiu, Aurelian Ioan; International Search Report and Written Opinion for PCT Application No. PCT/US20/18593, filed Feb. 18, 2020, dated May 7, 2020, 9 pgs.

Braun, Clifton; Corrected Notice of Allowance for U.S. Appl. No. 16/836,468, filed Mar. 31, 2020, dated Aug. 31, 2021, 6 pgs.

Braun, Clifton; Notice of Allowance for U.S. Appl. No. 16/836,468, filed Mar. 31, 2020, dated Aug. 12, 2021, 13 pgs.

Furcoiu, Aurelian Ioan; Non-Final Office Action for U.S. Appl. No. 16/845,557, filed Apr. 10, 2020, dated Aug. 17, 2021, 35 pgs.

Furcoiu, Aurelian Ioan; Corrected Notice of Allowance for U.S. Appl. No. 16/786,246, filed Feb. 10, 2020, dated Aug. 31, 2021, 6 pgs.

Furcoiu, Aurelian Ioan; Corrected Notice of Allowance for U.S. Appl. No. 16/786,246, filed Feb. 10, 2020, dated Aug. 6, 2021, 7 pgs.

Braun, Cliff; Extended European Search report for U.S. Appl. No. 18/913,510 6, filed Nov. 30, 2018, dated Sep. 13, 2021, 7 pgs.

Furcoiu, Aurelian Ioan; International Preliminary Reporton Patentability for PCT Application No. PCT/US20/18593, filed Feb. 18, 2020, dated Sep. 2, 2021, 8 pgs.

Braun, Clifton; Non-Final Office Action for U.S. Appl. No. 16/836,468, filed Mar. 31, 2020, dated May 20, 2021, 29 pgs.

Furcoiu, Aurelian Ioan; Examiner-Initiated Interview Summary for U.S. Appl. No. 16/845,557, filed Jan. 10, 2020, dated Apr. 21, 2021, 2 pgs.

Furcoiu, Aurelian Ioan; Non-Final Office Action for U.S. Appl. No. 16/792,984, filed Feb. 18, 2020, dated May 25, 2021, 25 pgs.

Furcoiu, Aurelian Ioan; Corrected Notice of Allowance for U.S. Appl. No. 16/786,193, filed Feb. 10, 2020, dated May 17, 2021, 6 pgs.

Furcoiu, Aurelian Ioan; Corrected Notice of Allowance for U.S. Appl. No. 16/786,193, filed Feb. 10, 2020, dated Jun. 22, 2021, 6 pgs.

Furcoiu, Aurelian Ioan; Notice of Allowance for U.S. Appl. No. 16/786,193, filed Feb. 10, 2020, dated Apr. 26, 2021, 9 pgs.

Braun, Clifton; Notice of Allowance for U.S. Appl. No. 16/836,468, filed Mar. 31, 2020, dated Oct. 1, 2021, 9 pgs.

Furcoiu, Aurelian Ioan; Final Office Action for U.S. Appl. No. 16/792,984, filed Feb. 18, 2020, dated Nov. 24, 2021, 15 pgs.

Furcoiu, Aurelian Ioan; Notice of Allowance for U.S. Appl. No. 16/786,246, filed Feb. 10, 2020, dated Oct. 14, 2021, 9 pgs.

Furcoiu, Aurelian Ioan; International Preliminary Reporton Patentability for PCT Application No. PCT/US20/28038, filed Apr. 14, 2020, dated Nov. 4, 2021, 8 pgs.

Furcoiu, Aurelian Ioan; Notice of Allowance for U.S. Appl. No. 16/845,557, filed Apr. 10, 2020, dated Jan. 11, 2022, 17 pgs.

Furcoiu, Aurelian Ioan; Notice of Allowance for U.S. Appl. No. 16/792,984, filed Feb. 28, 2020, dated Jan. 31, 2022, 9 pgs.

* cited by examiner

DEPLOYMENT PROBE FOR PIPE REPAIR DEVICE

CROSS-REFERENCE TO RELATED APPLICATIONS

The present application claims the benefit of U.S. Provisional Application No. 62/885,031, filed Aug. 9, 2019, which is hereby specifically incorporated by reference herein in its entirety.

TECHNICAL FIELD

This disclosure relates to pipe repair. More specifically, this disclosure relates to a deployment probe for deploying a pipe repair device.

BACKGROUND

Piping systems, including municipal water systems, can develop breaks in pipe walls that can cause leaking. Example of breaks in a pipe wall can include radial cracks, axial cracks, point cracks, etc. Repairing a break in a pipe wall often requires the piping system to be shut off, which can be inconvenient for customers and costly for providers. Further, repairs can necessitate grandiose construction, including the digging up of streets, sidewalks, and the like, which can be costly and time-consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a pipe repair assembly comprising a retainer device comprising a retainer tab extending into a retainer slot, the retainer device movable between an engaged position and a disengaged position; and a pipe repair device comprising a spring and an engagement tab, the engagement tab defining a channel, wherein, in the engaged position, the engagement tab is received in the retainer slot and the retainer tab engages the channel, and in the disengaged position, the engagement tab is disposed outside of the retainer slot and the retainer tab is disengaged from the channel.

Also disclose is a deployment probe for repairing a pipeline comprising a probe body configured to be navigated through a pipeline, the probe body defining an interior probe void; a pipe repair device configured to engage an inner wall of the pipeline; a retainer device movable between an engaged position and a disengaged position within the interior probe void, the retainer device comprising a retainer tab, wherein, in the engagement position, the retainer tab is engaged with the pipe repair device, and in the disengaged position, the retainer tab is disengaged from the pipe repair device; and a release mechanism configured to move the retainer device from the engaged position to the disengaged position.

A method for repairing a pipeline is also disclosed, the method comprising providing a deployment probe comprising a retainer device movable between an engaged position and a disengaged position, the retainer device comprising a retainer tab; mounting a pipe repair device to the deployment probe in the engaged position, wherein the retainer tab slidably engages a channel of the pipe repair device; navigating the deployment probe to a location of damage in the pipeline; moving the retainer device to the disengaged position, wherein the retainer tab is disengaged from the channel; and expanding the pipe repair device to engage an inner wall of the pipeline.

Disclosed is a deployment probe for a pipe repair device comprising a probe body defining a void; a retainer wheel received within the void and movable between an engaged position and a disengaged position, the retainer wheel comprising a retainer tab, wherein, in the engagement position, the retainer tab is engaged with the pipe repair device, and in the disengaged position, the retainer tab is disengaged from the pipe repair device; and a release mechanism configured to move the retainer wheel from the engaged position to the disengaged position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
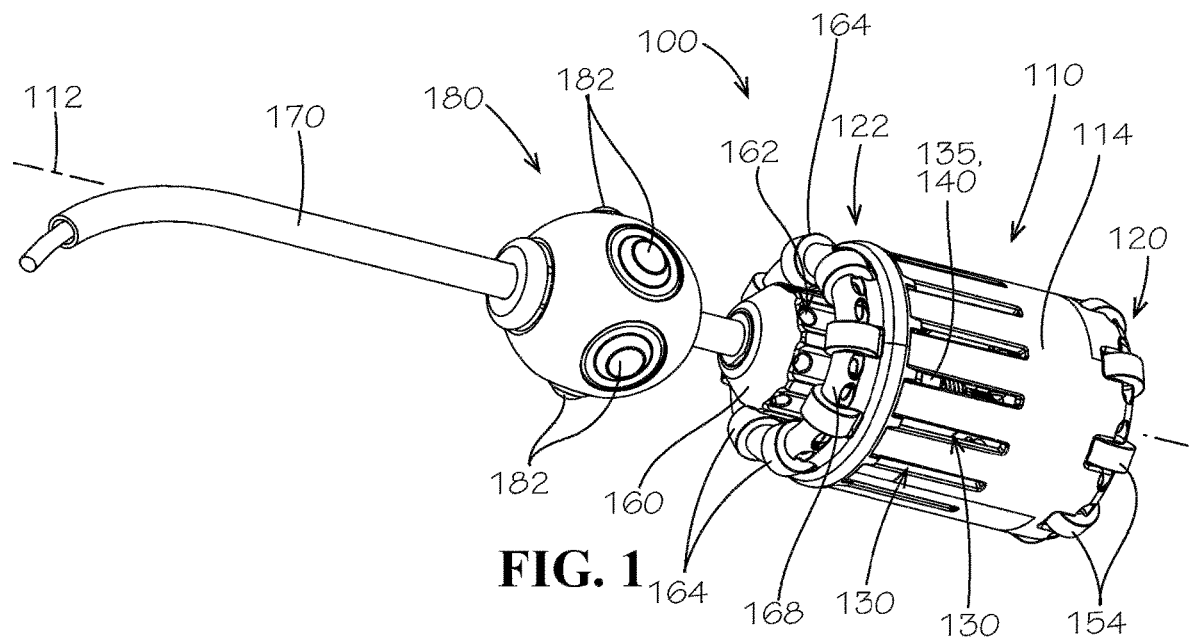
FIG. 1 is a rear perspective view of a deployment probe, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a deployment probe for repairing a pipeline and associated methods, systems, devices, and various apparatus. Example aspects of the deployment probe can comprise a probe body and a retainer device configured to releasably engage the pipe repair device. It would be understood by one of skill in the art that the disclosed deployment probe is described in but a few exemplary aspects among many. No particular terminology or description should be considered limiting on the disclosure or the scope of any claims issuing therefrom.

FIG. 1 illustrates a first aspect of a deployment probe 100 for repairing a pipeline, according to the present disclosure. Example aspects of the deployment probe 100 can be sized and shaped to be easily inserted into and navigable through the pipe or pipeline (not shown) to a location of a crack or other damage. The deployment probe 100 can be configured to deploy a pipe repair device 200 (shown in FIG. 2) within the damaged pipe. Example aspects of the deployment probe 100 can comprise a substantially cylindrical probe body 110, as shown. A probe axis 112 can extend through a center of the probe body 110. The pipe repair device 200 can be configured to wrap around a circumference of the probe body 110 and to engage an outer surface 114 thereof. An inner surface 716 (shown in FIG. 7) of the probe body 110 can define an interior probe void 718 (shown in FIG. 7). The probe body 110 can also define a front end 120 and a rear end 122. According to example aspects, a plurality of body slots 130 can be formed through the probe body 110. The slots 130 can extend from the rear end 122 of the probe body 110 towards the front end 120 in the axial direction, relative to the probe axis 112, as shown, and can allow access to the interior probe void 718. In some aspects, the deployment probe 100 can further comprise a retainer device 135 for releasably engaging the pipe repair device 200. In the present aspect, the retainer device 135 can be a retainer wheel 140. The retainer wheel 140 can be received within the probe void 718 and is visible through the slots 130 in the present aspect.

According to example aspects, a probe head 550 (shown in FIG. 5) can be connected to or monolithically formed with the probe body 110 at the front end 120. Example aspects of the probe head 550 can define one or more front openings 562 (shown in FIG. 5) formed therethrough. In the present aspect, the deployment probe 100 can also comprise a rear cap 160 connected to or monolithically formed with the probe body 110 at the rear end 122. Other aspects may not comprise the probe head 550 and/or the rear cap 160. As shown, the probe body 110 can also define one or more rear openings 162 formed through the rear cap 160, such that fluid in the pipe can flow through the front openings 562, into the probe void 718, and out of the rear openings 162, or in the reverse direction. As such, fluid in the pipeline can continue to flow substantially uninterrupted as the deployment probe 100 is navigated through the pipeline.

Furthermore, in some aspects, as shown, the deployment probe 100 can comprise front wheels 154 positioned generally around an outer circumference 556 (shown in FIG. 5) of the probe head 550 or at the front end 120 of the probe body 110. In the present aspect, rear wheels 164 can also be positioned on the rear cap 160 or at the rear end 122 of the probe body 110. For example, as shown, the rear wheels 164 can be mounted to an annular flange 168 of the rear cap 160. The front and rear wheels 154,164 can facilitate the navigation of the deployment probe 100 through the pipe and/or a pipeline. In other aspects, ball bearings 864 (shown in FIG. 8), or any other suitable rolling, gliding, or sliding mechanism known in the art, can be used in conjunction with or in lieu of some or all of the front and rear wheels 154,164.

Example aspects of the deployment probe 100 can comprise a navigation stem 170 extending from the rear end 122 of the probe body 110. The navigation stem 170 can aid in driving and steering the deployment probe 100 through the pipe or pipeline. In example aspects, the navigation stem 170 can be formed from a flexible, resilient material, such as plastic, while in other aspects, the navigation stem 170 can be formed from another suitable resilient material, such as a rubber material. Example aspects of the deployment probe 100 can also comprise a release mechanism, such as a release cable 770 (shown in FIG. 7), extending within the navigation stem 170. Example aspects of the release cable 770 can be formed from a metal material, such as, for example, steel. The release cable 770 can be actuated to disengage the deployment probe 100 from the pipe repair device 200, as will be described in further detail below. In the present aspect, the release cable 770 can be a torque cable. In other aspects, the release mechanism can be any other suitable actuation mechanism known in the art, including, but not limited to, a piston.

In the present aspect, the deployment probe 100 can comprise a float 180 mounted to the navigation stem 170 proximate to the rear cap 160, as shown. The float 180 can be substantially spherical in shape, as shown; however, in other aspects, the float 180 can define any other suitable shapes. Example aspects of the float 180 can be buoyant, such that the float 180 can be configured to float in the fluid within the pipeline. The float 180 can aid in keeping the deployment probe 100 centered within the pipeline and away from an inner wall of the pipe or pipeline, which can facilitate easier navigation of the deployment probe 100 through the pipeline. Furthermore, as shown, the float 180 can comprise a plurality of float ball bearings 182 (or any other suitable rolling, sliding, or gliding mechanisms), which can further facilitate navigation of the float 180 through the pipe or pipeline.

Figure 2:
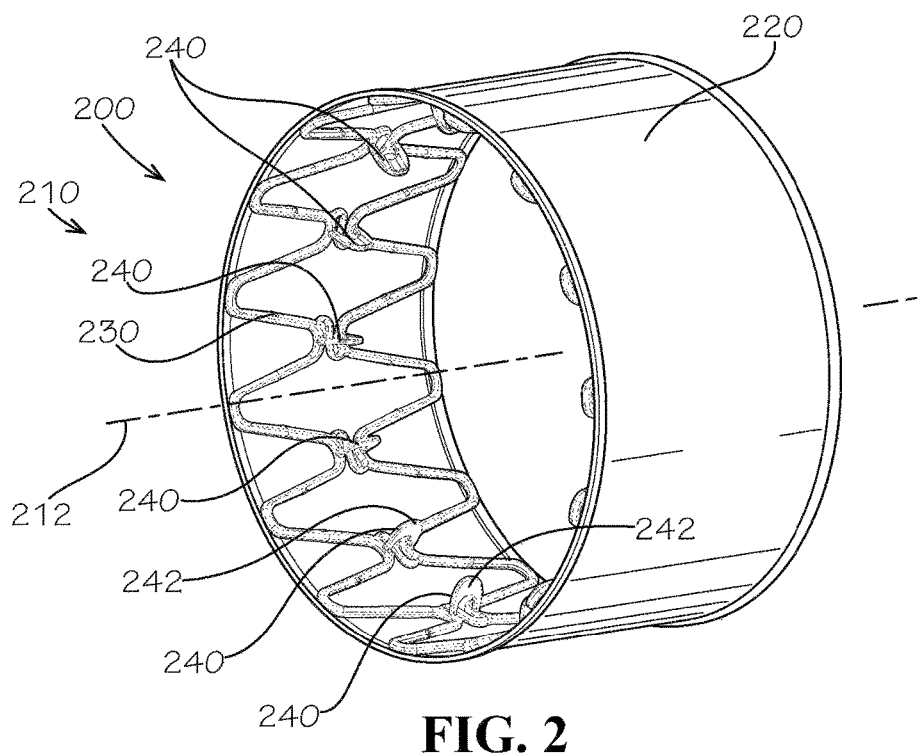
FIG. 2 is a top perspective view of a pipe repair device, in accordance with one aspect of the present disclosure.

FIG. 2 illustrates a first aspect of the pipe repair device 200, according to the present disclosure. The pipe repair device 200 can be, for example, a stent 210. Example aspects of the stent 210 can comprise a stent spring 230 and seal 220 configured to wrap around the stent spring 230. Example aspects of the stent spring 230 can define a spring force and can be expandable and compressible and/or foldable, such that the stent 210 can be oriented in a natural, expanded configuration, as shown in FIG. 2, and a compressed or folded configuration. According to example aspects, the stent 210 can be expanded within the damaged pipe such that the seal 220 can engage the inner wall of the pipe where a crack or other damage is present in order to create a watertight seal between the stent 210 and the inner wall of the pipe to prevent leaking at the damage site.

In some example aspects, the weight of the deployment probe 100 (shown in FIG. 1) can be sufficient such that the deployment probe 100 can rest against a bottom of the inner wall of the pipe when the deployment probe 100 is in position for deploying the stent 210. In other aspects, the deployment probe 100 may be driven into contact with the inner wall of the pipe. The deployment probe 100 can remain in contact with the inner wall until the stent 210 is fully expanded. In some aspects, the engagement of the deployment probe 100 with the inner wall of the pipe can aid in preventing the stent 210 from being swept away by fluid in the pipeline during expansion of the stent 210. For example, in a particular aspect, an annular front lip 510 (shown in FIG. 5) and an annular rear lip 520 (shown in FIG. 5) of the deployment probe 100 can be in contact with the inner wall of the pipe and can serve as a stop for the stent 210 while the stent 210 is being expanded to engage the inner wall.

According to example aspects, the stent spring 230 can comprise a metal material, such as, for example, stainless steel, spring steel, aluminum, nitinol, or cobalt chromium. In other aspects, the stent spring 230 can comprise a plastic material, such as, for example, nylon, POM (polyoxymethylene), or PVC (polyvinyl chloride), and in still other aspects, the stent spring 230 can comprise a carbon fiber material. According to example aspects, the seal 220 can comprise a flexible and stretchable material, such as, for example, neoprene. In other aspects, the seal 220 can be formed from another synthetic rubber material such as EPDM rubber, natural rubber, foam, epoxy, silicone, a resin-soaked cloth, or any other suitable flexible material for providing a watertight seal 220. In another aspect, the seal 220 can be formed as an uncured resin-filled sleeve, which can be cured in place with UV (ultraviolet) radiation or any other suitable type of radiation. In some aspects, the seal 220 can be retained on the stent spring 230 by snugly wrapping around the expanded stent spring 230 to create friction between the seal 220 and the stent spring 230. In the present aspect, the seal 220 can be retained on the stent spring 230 by stitching, adhesives, ties, clips, or any other suitable fastener or combination of fasteners known in the art.

The stent 210 can define a stent axis 212 extending therethrough, as shown. When the stent 210 is mounted to the deployment probe 100, the stent 210 can be substantially concentric with the deployment probe 100, and as such, the stent axis 212 can be substantially co-linear with the probe axis 112 (shown in FIG. 1). According to example aspects, the stent spring 230 can comprise one or more engagement tabs 240 extending radially inward. Each engagement tab 240 can be configured to be received through a corresponding one of the slots 130 (shown in FIG. 1) of the deployment probe 100, such that a distal portion 242 of each engagement tab 240 can be received within the probe void 718 (shown in FIG. 7) of the deployment probe 100.

Figure 3:
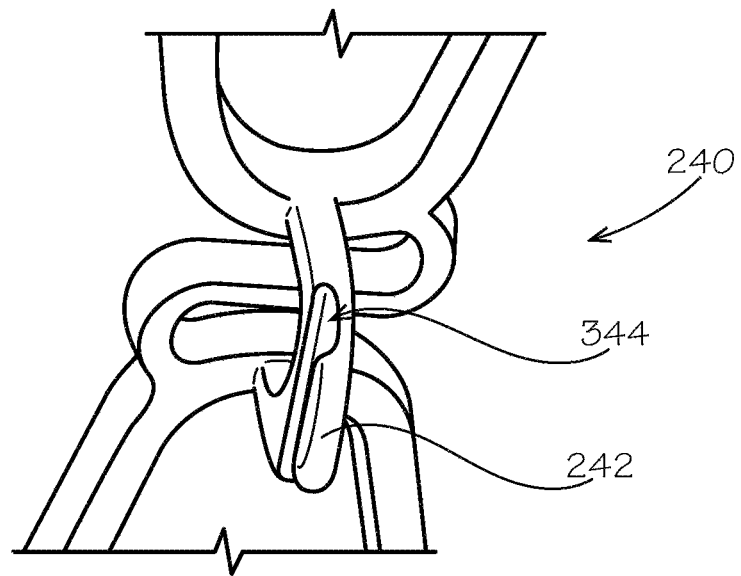
FIG. 3 is a detail view of an engagement tab of the pipe repair device of FIG. 2.
Figure 4:
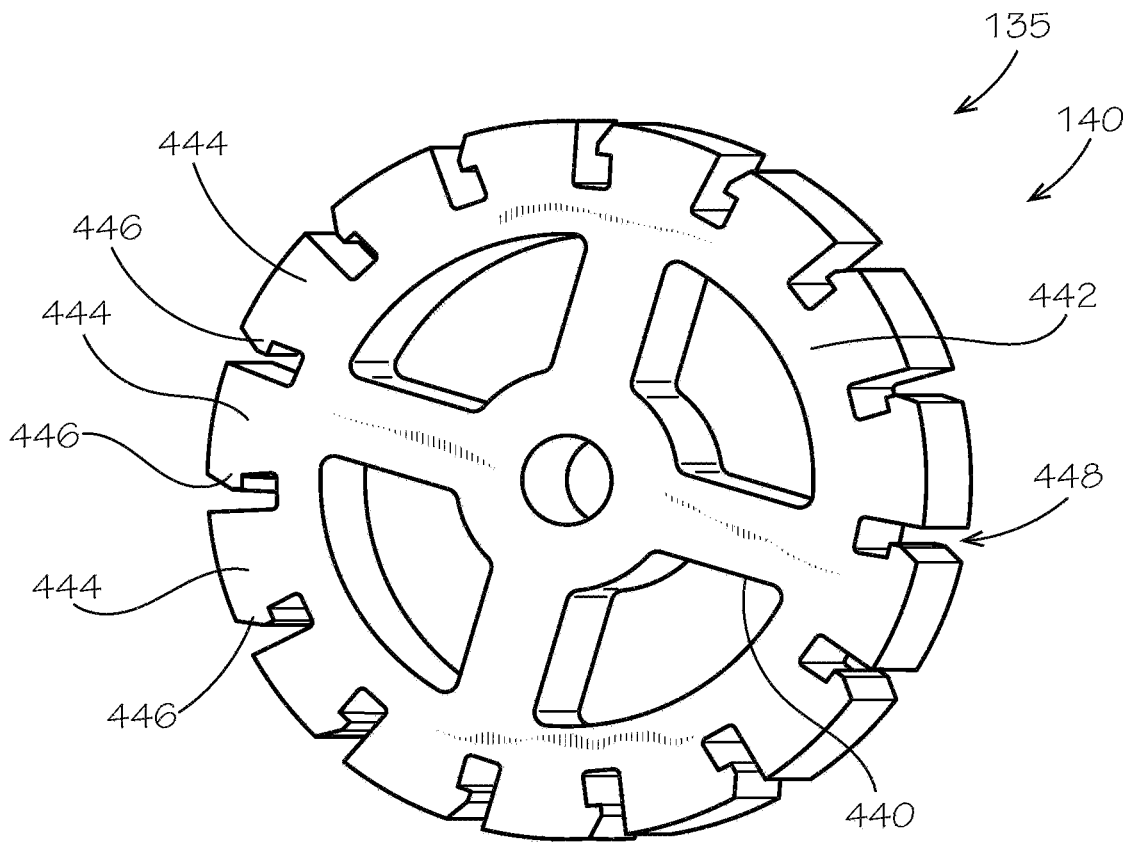
FIG. 4 is perspective view of a retainer device of the deployment probe of FIG. 1.

FIG. 3 illustrates a detail view of one of the engagement tabs 240. As shown, the engagement tab 240 can define a channel 344 formed proximate to the distal portion 242 thereof. In example aspects, the channel 344 can extend substantially in the axial direction, relative to the stent axis 212 (shown in FIG. 2). FIG. 4 illustrates an example aspect of the retainer device 135 of the deployment probe 100, which can be the retainer wheel 140 in the present aspect. The retainer wheel 140 can be slidably received within the probe void 718 (shown in FIG. 7) and can be movable between an engaged position and a disengaged position. Example aspects of the retainer wheel 140 can be operatively connected to the release cable 770 (shown in FIG. 7), such that the release cable 770 can control the movement of the retainer wheel 140 within the void 718 between the engaged and disengaged positions. As shown, the retainer wheel 140 can comprise a plurality of spokes 440 extending radially outward to a circular wheel frame 442. The retainer wheel 140 can further comprise a plurality of retainer projections 444 extending radially outward from the wheel frame 442. A retainer slot 448 can be defined between each adjacent pair of retainer projections 444. In the present aspect, each of the retainer projections 444 can define a retainer tab 446 extending therefrom into an adjacent one of the retainer slots 448. According to example aspects, each of the retainer tabs 446 can be configured to slidably engage a corresponding one of the channels 344 (shown in FIG. 3) formed in a corresponding one of the engagement tabs 240 (shown in FIG. 2).

In example aspects, the stent 210 and the retainer wheel 140 can together define a pipe repair assembly. To retain the stent 210 (shown in FIG. 2) on the deployment probe 100 (shown in FIG. 1), the retainer wheel 140 can be oriented in the engaged position, wherein each of the engagement tabs 240 can extend into a corresponding one of the retainer slots 448 and each of the retainer tabs 446 can engage a corresponding one of the channels 344. To release the stent 210 from the deployment probe 100, the retainer wheel 140 can be moved to the disengaged position, wherein the engagement tabs 240 can be disposed outside of the corresponding retainer slots 448 and the retainer tabs 446 can be disengaged from the corresponding channels 344. To disengage the retainer tabs 446 from the channels 344, the release cable 770 can be actuated to axially slide the retainer wheel 140 within the probe void 718 from the engaged position to the disengaged position while the stent 210 remains stationary, thus axially sliding the retainer tabs 446 out of the stationary corresponding channels 344. When the retainer wheel 140 disengages the stent 210, the stent spring 230 (shown in FIG. 2) of the stent 210 can bias the stent 210 to the expanded configuration within the pipeline.

Figure 5:
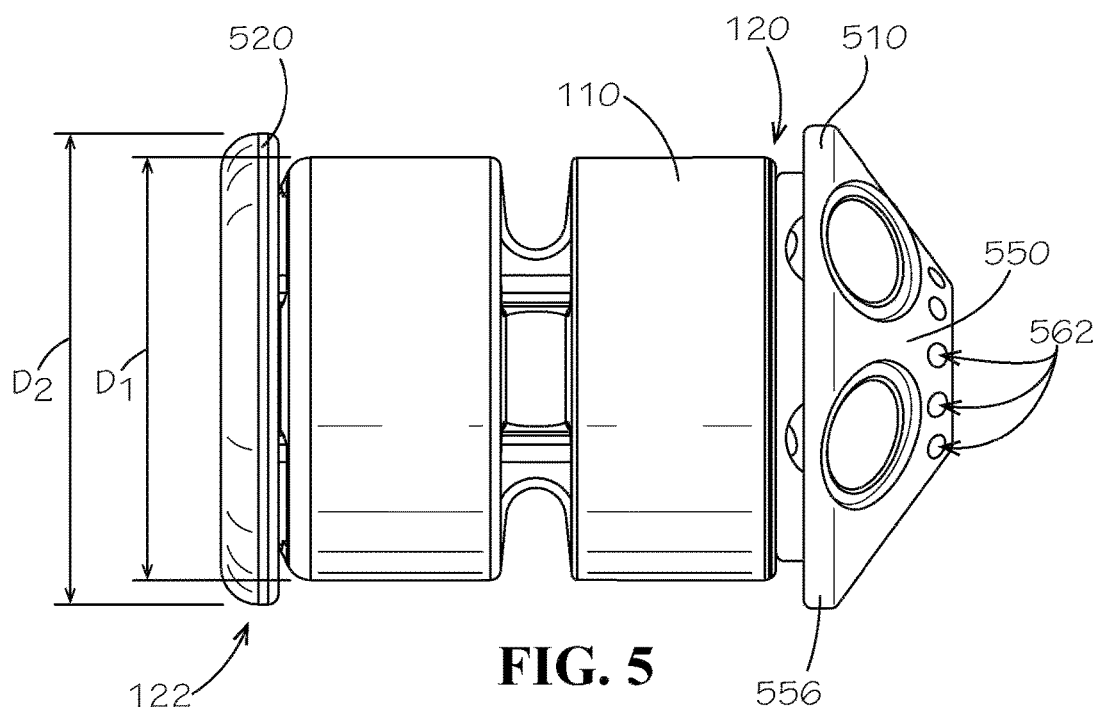
FIG. 5 is a side view of a probe body of the deployment probe, in accordance with one aspect of the present invention.

FIG. 5 illustrates the probe body 110 according to another aspect of the present invention. In example aspects, the probe head 550 can be connected to the probe body 110 at the front end 120 thereof. In some example aspects, such as the present aspect, there may be no rear cap 160 (shown in FIG. 1) attached to the probe body 110 at the rear end 122 thereof, but rather, the annular rear lip 520 can be monolithically formed with the probe body 110. As shown, the annular front lip 510 of the probe head 550 can be defined proximate to the front end 120 of the probe body 110, and the annular rear lip 520 can be defined proximate to the rear end 122 of the probe body 110. In the present aspect, the front lip 510 can extend radially outward from the probe head 550, and the rear lip 520 can extend radially outward from the probe body 110. As such, a diameter $D_1$ of the probe body 110 can be less than a diameter $D_2$ of the front and rear lips 510,520. According to example aspects, when the stent 210 (shown in FIG. 2) is mounted on the probe body 110 in the compressed configuration, the stent 210 can define a diameter that can be about equal to or less than the diameter $D_2$ of the front and rear lips 510,520. As such, in example aspects, the front and rear lips 510,520 can aid in preventing the seal 220 (shown in FIG. 2) of the stent 210 from engaging the inner wall of the pipeline during transportation therethrough, which can allow for easier passage of the deployment probe 100 (shown in FIG. 1) through the pipeline.

Figure 6:
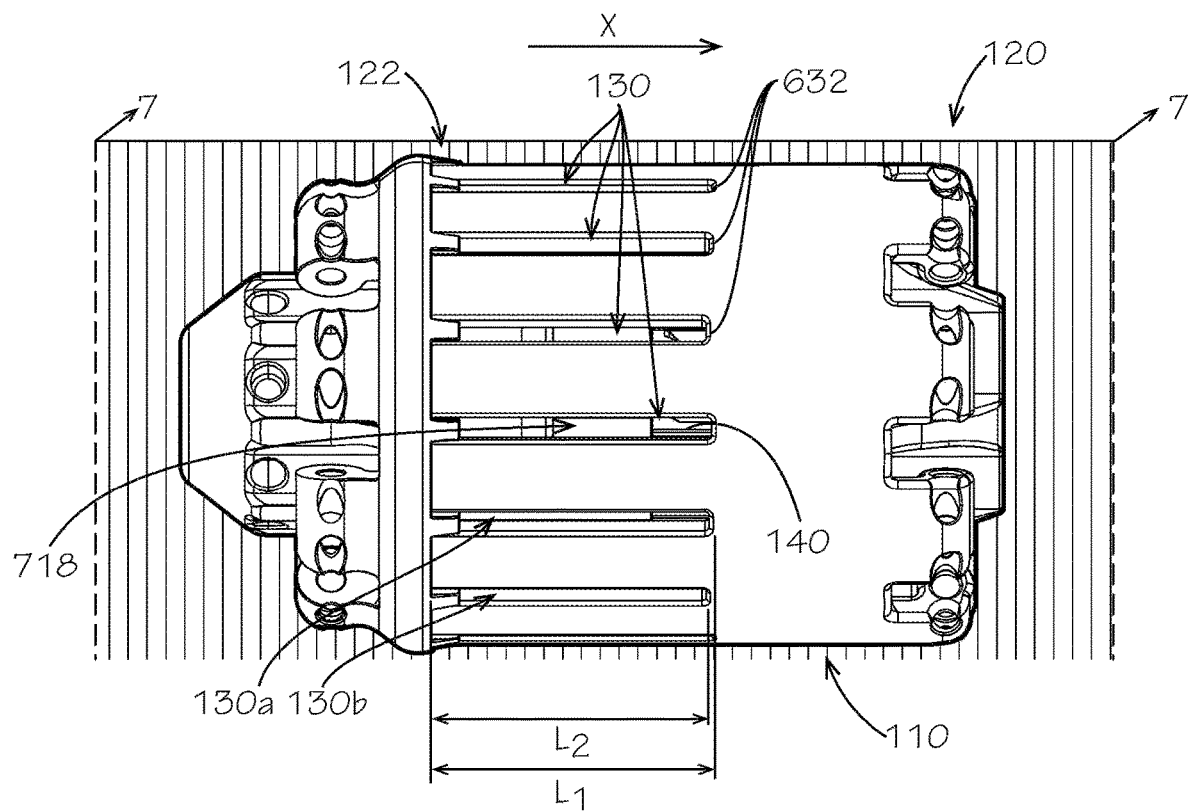
FIG. 6 is a side view of the probe body, in accordance with another aspect of the present disclosure.

FIG. 6 illustrates the probe body 110 according to another aspect of the present invention. As shown, the slots 130 can be formed through the probe body 110, and can extend in the axial direction from the rear end 122 of the probe body 110 towards the front end 120. According to example aspects, the slots 130 can extend to varying lengths along the probe body 110. For example, as shown, a first one of the slots 130*a* can extend to a length $L_1$ and a second one of the slots 130*b* can extend to a length $L_2$, wherein $L_1$ can be greater than $L_2$. According to example aspects, as described above, the retainer wheel 140 can be configured to slide axially within the void 718 in the general direction X from the engaged position to the disengaged position. In other aspects, the retainer wheel 140 may slide axially in a reverse direction from the engaged position to the disengaged position. According to example aspects, the stent 210 (shown in FIG. 2) may slide along with the retainer wheel 140 until the engagement tabs 240 (shown in FIG. 2) of the stent spring 230 (shown in FIG. 2) abut a slot end 632 of the corresponding slot 130. When the engagement tabs 240 abut the corresponding slot ends 632, the stent 210 (shown in FIG. 2) can be held stationary and can be prevented from sliding along with the retainer wheel 140. As the retainer wheel 140 continues to slide within the void 718 in the direction X, the retainer tabs 446 (shown in FIG. 4) can slide out of the corresponding channels 344 (shown in FIG. 3). In aspects wherein the slots 130 can define varying lengths, each of the engagement tabs 240 can abut the slot ends 632 of the corresponding slots 130 at varying times, and as such, the disengagement of the retainer tabs 446 from the corresponding channels 344 can be staggered. For example, in one aspect, each of the slots 130 can define a different length, and as such, the retainer tabs 446 can disengage the corresponding channels 344 one at a time. In other aspects, any number of channels 344 may be disengaged in unison (e.g., two at a time, three at a time, etc.). Staggering the disengagement of the retainer tabs 446 from the channels 344 can stagger forces that may occur as the engagement tabs 240 are disengaged and the stent spring 230 biases the stent 210 to the expanded configuration.

Figure 7:
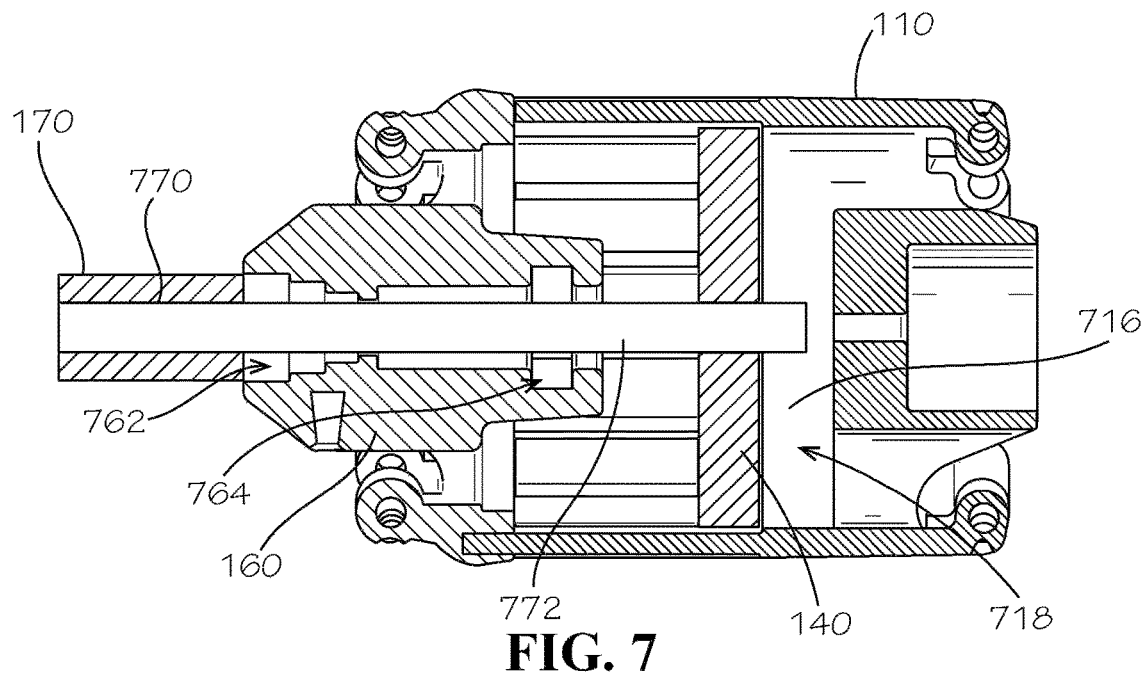
FIG. 7 is a cross section view of the probe body of FIG. 6 taken along line 7-7 in FIG. 6.

FIG. 7 is a cross-sectional view of the probe body 110 of FIG. 6 taken along line 7-7 in FIG. 6. In the present aspect, a proximal end 772 of the release cable 770 can extend through a passageway 762 in the rear cap 160, into the probe void 718, and can be coupled with the retainer wheel 140. In some aspects, the proximal end 772 of the release cable 770 can be threaded. According to example aspects, a nut groove 764 can be formed in the rear cap 160 and can be configured to receive and retain a nut therein. For example, in the present aspect, the nut groove 764 can be hexagonally-shaped for receiving a hexagonally-shaped nut therein; however, in other aspects, the nut groove 764 can define any other suitable shape. According to example aspects, the nut received within the nut groove 764 may define a threaded opening configured to mate with the threaded proximal end 772 of the release cable 770.

Figure 8:
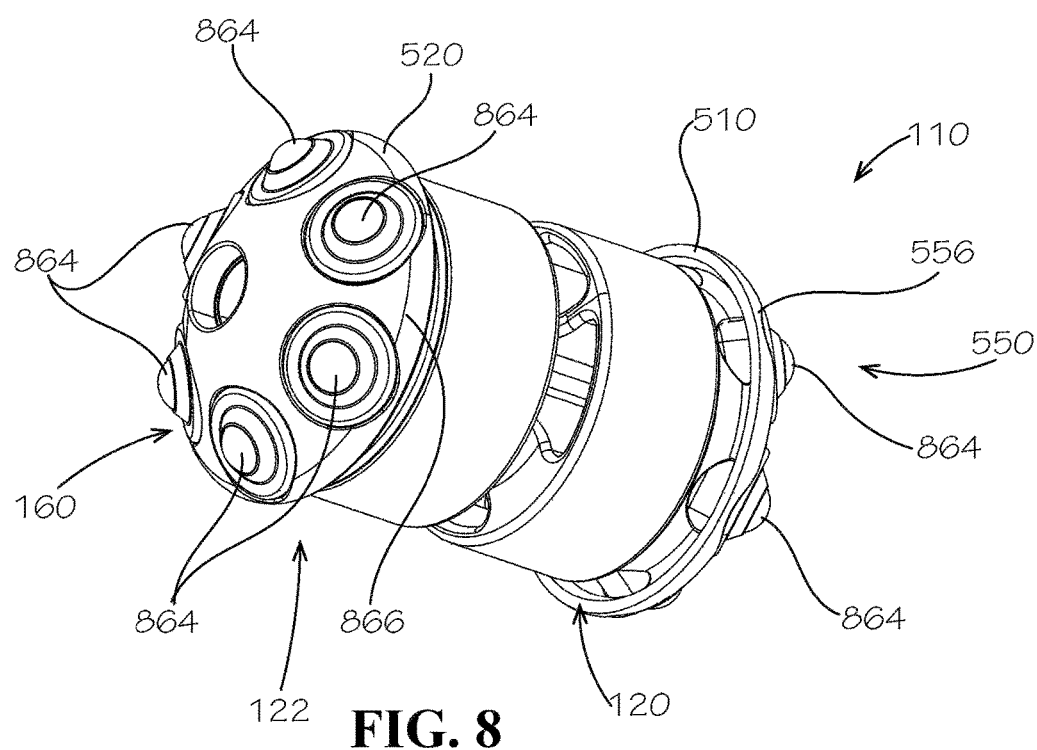
FIG. 8 is a rear perspective view of the probe body, in accordance with another aspect of the present disclosure.

FIG. 8 illustrates the probe body 110 according to another example aspect of the present disclosure. As shown, in the present aspect, the probe body 110 can comprise the ball bearings 864. In some aspects, a plurality of the ball bearings 864 can be positioned on the rear cap 160 (or at the rear end 122 of the probe body 110 in aspects not comprising the rear cap 160) and on the probe head 550 (or at the front end 120 of the probe body 110 in aspects not comprising the probe head 550). In the present aspect, six large ball bearings 864 can be positioned about the outer circumference 556 of the probe head 550 and six large ball bearings 864 can be positioned about an outer circumference 866 of the rear cap 160. In other aspects, however, the deployment probe 100 (shown in FIG. 1) can comprise more or fewer ball bearings 864, and the ball bearings 864 can be positioned in any other suitable arrangement. Furthermore, in other aspects, the deployment probe 100 can comprise any other suitable rolling, sliding, and/or gliding mechanisms known in the art, or any combination thereof.

Figure 9:
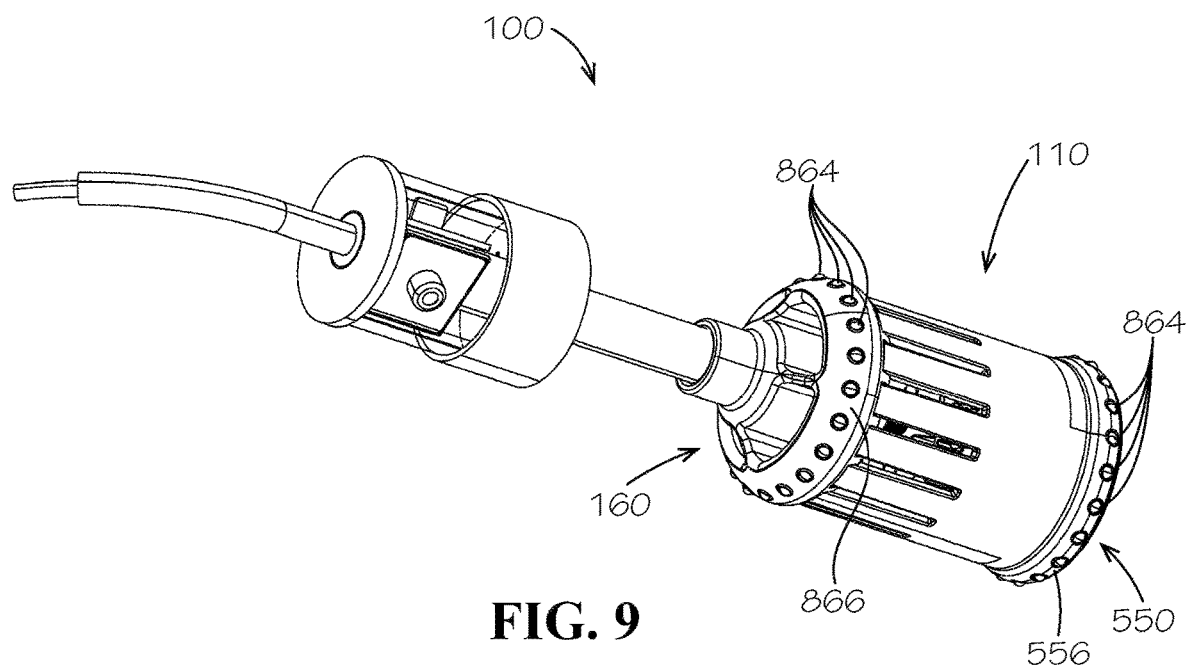
FIG. 9 is a rear perspective view of the deployment probe, in accordance with another aspect of the present disclosure.
Figure 10:
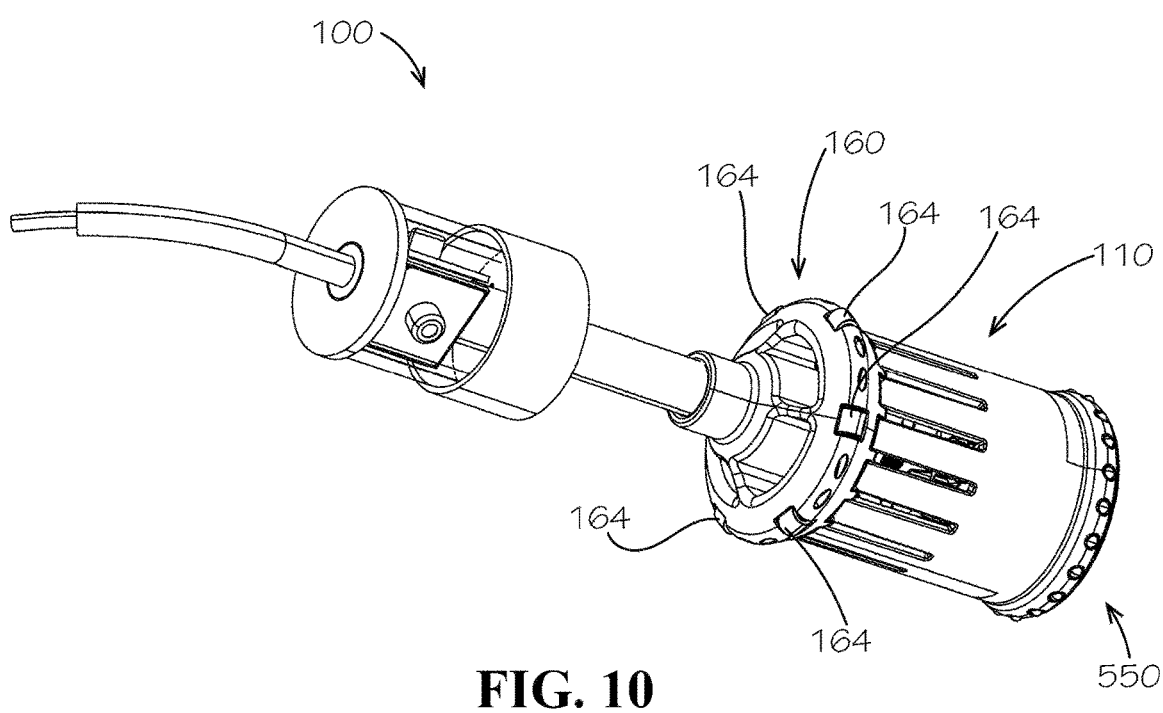
FIG. 10 is a rear perspective view of the deployment probe, in accordance with another aspect of the present disclosure.

FIG. 9 illustrates another example aspect of the deployment probe 100. As shown, the probe body 110 of the deployment probe 100 can be substantially similar to the probe body 110 of FIG. 8; however, in the present aspect, the probe body 110 can comprise more and smaller ball bearings 864 positioned about the outer circumference 556 of the probe head 550 and outer circumference 866 of the rear cap 160. FIG. 10 illustrates still another example aspect of the deployment probe 100 illustrating another example arrangement of the rear wheels 164 positioned on the rear cap 160.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. It should be emphasized that the above-described embodiments are merely possible examples of implementations, merely set forth for a clear understanding of the principles of the present disclosure. Any process descriptions or blocks in flow diagrams should be understood as representing modules, segments, or sections of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A pipe repair assembly comprising:
    a retainer device comprising a retainer tab and a retainer slot, the retainer tab extending into a retainer slot, the retainer device movable between an engaged position and a disengaged position; and
    a pipe repair device comprising a spring and an engagement tab, the engagement tab defining a channel, wherein, in the engaged position, the engagement tab is received in the retainer slot and the retainer tab engages the channel, and in the disengaged position, the engagement tab is disposed outside of the retainer slot and the retainer tab is disengaged from the channel.

2. The pipe repair assembly of claim 1, wherein the pipe repair device is configurable in an expanded configuration and a compressed configuration, and the spring biases the pipe repair device to the expanded configuration.

3. The pipe repair assembly of claim 2, wherein the pipe repair device is retained in the compressed configuration when the retainer device is in the engaged position, and wherein the pipe repair device is allowed to expand to the expanded configuration when the retainer device is in the disengaged position.

4. The pipe repair assembly of claim 1, wherein the engagement tab extends radially inward from the spring and defines a distal portion opposite the spring, the channel formed proximate to the distal portion.

5. The pipe repair assembly of claim 1, wherein an axis is defined through a center of the pipe repair device and the channel extends substantially perpendicular to the axis.

6. The pipe repair assembly of claim 1, wherein the pipe repair device further comprises a seal wrapped around the spring, the seal configured to engage an inner wall of a pipe.

7. The pipe repair assembly of claim 1, wherein the retainer device is a retainer wheel, the retainer wheel comprising a circular wheel frame and a retainer projection extending radially outward from the circular wheel frame, the retainer projection oriented adjacent to the retainer slot, the retainer tab extending from the retainer projection into the retainer slot.

8. The pipe repair assembly of claim 7, further comprising a spoke extending radially inward from the circular wheel frame.

9. A deployment probe for repairing a pipeline comprising:
    a probe body configured to be navigated through a pipeline, the probe body defining an interior probe void;
    a pipe repair device configured to engage an inner wall of the pipeline;
    a retainer device movable between an engaged position and a disengaged position within the interior probe void, the retainer device comprising a retainer tab, wherein, in the engagement position, the retainer tab is engaged with the pipe repair device, and in the disengaged position, the retainer tab is disengaged from the pipe repair device; and
    a release mechanism configured to move the retainer device from the engaged position to the disengaged position.

10. The deployment probe of claim 9, wherein the pipe repair device comprises an engagement tab, the engagement tab defining a channel, the retainer tab of the retainer device engaging the channel in the engaged position.

11. The deployment probe of claim 10, wherein the retainer device comprises a retainer projection and a retainer slot, the retainer projection oriented adjacent to the retainer slot, and wherein the retainer tab extends from the retainer projection into the retainer slot.

12. The deployment probe of claim 11, wherein the probe body defines a body slot allowing access to the interior probe void, and wherein the engagement tab extends through the body slot and into the interior probe void to engage the retainer slot.

13. The deployment probe of claim 12, wherein the body slot is a first body slot and the probe body further defines a second body slot, and wherein a length of the first body slot is greater than a length of the second body slot.

14. The deployment probe of claim 9, wherein the release mechanism is a torque cable, the torque cable extending into the interior probe void and engaging the retainer device, the torque cable configured to slide the retainer device axially within the interior probe void.

15. The deployment probe of claim 9, further comprise at least one of a wheel and a ball bearing configured to roll on the inner wall of the pipeline.

16. The deployment probe of claim 9, further comprising a navigation stem extending from a rear end of the probe body and a buoyant float mounted to the navigation stem.

17. The deployment probe of claim 9, further comprising an annular front lip adjacent to a front end of the probe body, wherein a diameter of the probe body can be less than a diameter of the annular front lip.

\* \* \* \* \*